Aug. 27, 1946.   R. BIRMANN   2,406,656
EXHAUST ENERGY CONVERTING MEANS FOR INTERNAL-COMBUSTION ENGINES
Filed April 4, 1939   3 Sheets-Sheet 1

WITNESS:
Rob P Kitchel

INVENTOR
Rudolph Birmann
BY
Busser & Harding
ATTORNEYS.

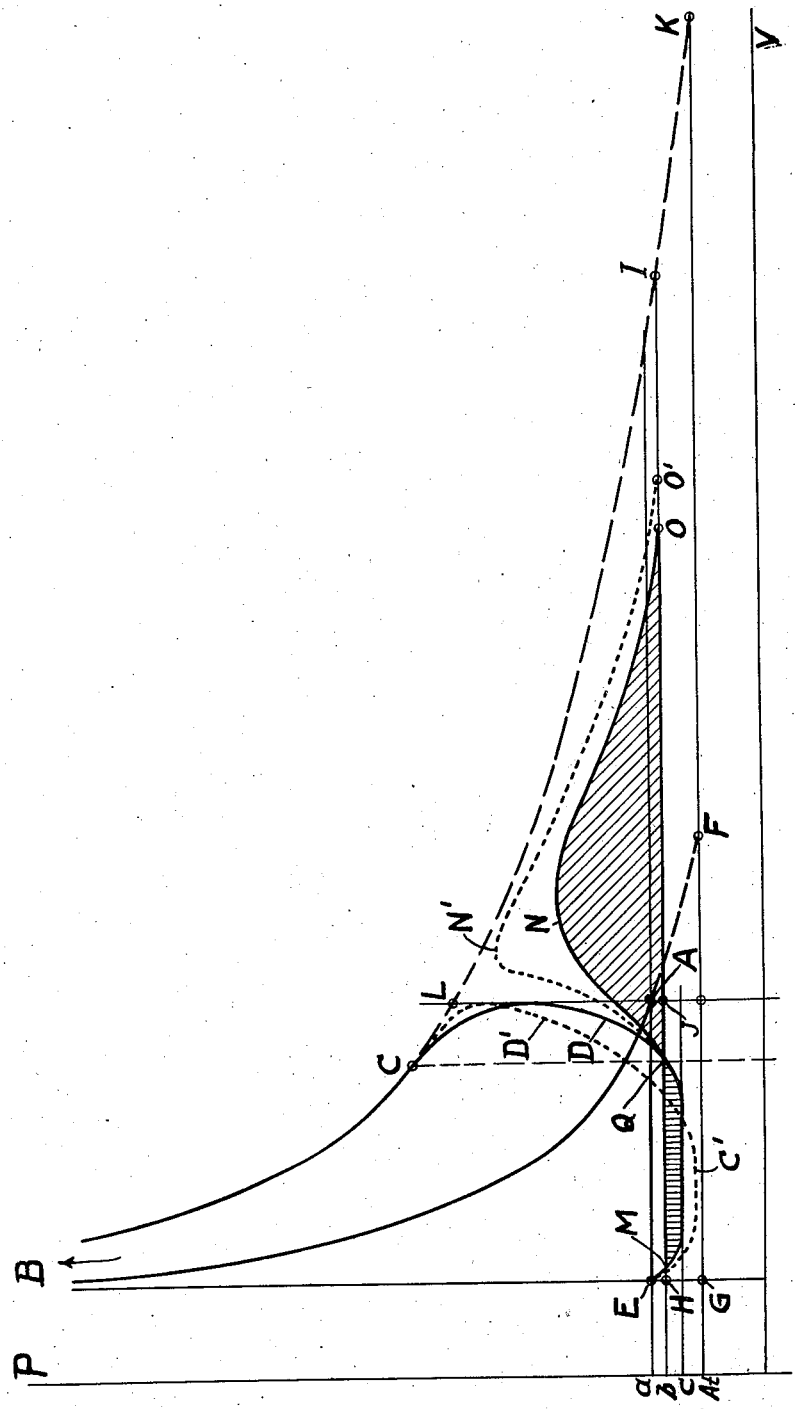

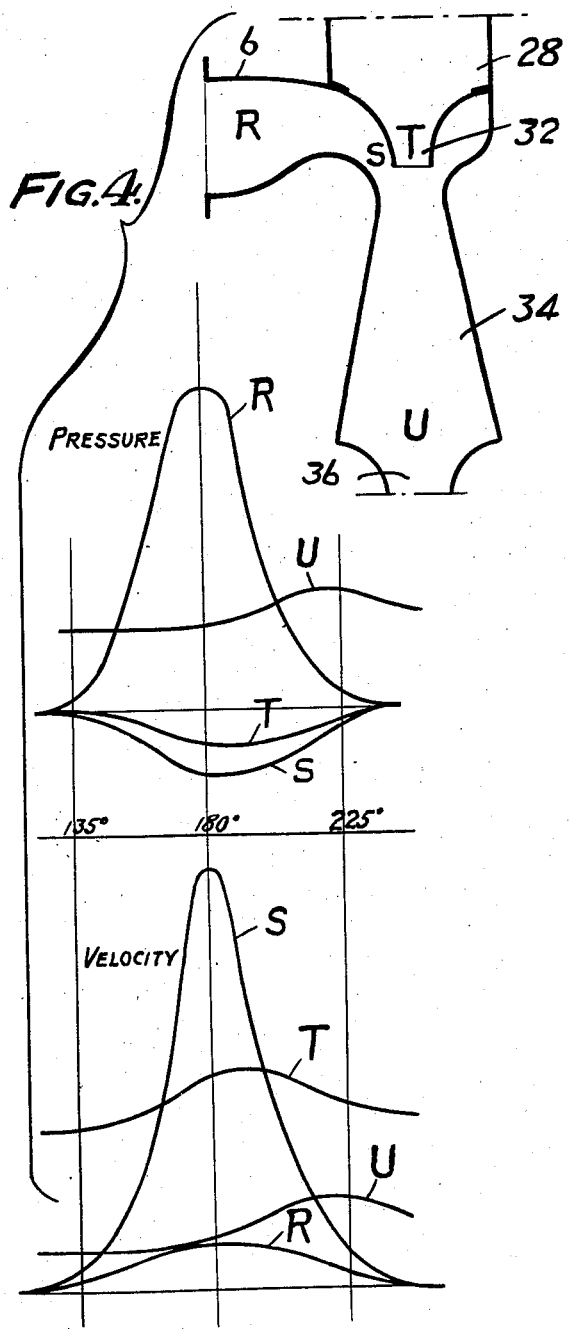

Patented Aug. 27, 1946

2,406,656

UNITED STATES PATENT OFFICE 2,406,656

EXHAUST ENERGY CONVERTING MEANS FOR INTERNAL-COMBUSTION ENGINES

Rudolph Birmann, Newtown, Pa., assignor, by mesne assignments, to Federal Reserve Bank of Philadelphia, a corporation of the United States of America Application April 4, 1939, Serial No. 265,920

4 Claims. (Cl. 60—13)

This invention relates to means for converting energy contained in exhaust gases from internal combustion engines in such fashion as to increase the efficiency of such engines and/or effect the driving of exhaust turbines, particularly for scavenging and supercharging purposes.

One object of the present invention is to provide a continuous flow with a practically constant pressure drop over the entire periphery of a turbine driven by exhaust gases so that the latter may be designed to operate with peak efficiency, eliminating ventilation losses and resulting in the minimum possible wetted surfaces and blade heights to give the optimum hydraulic and mechanical conditions.

Another and major object of the invention is accordingly to provide an energy converting manifold arrangement of such nature that the back pressure felt by the engine, particularly toward the end of the exhaust stroke of each cylinder, is low, though it is still possible to utilize a very high percentage of the energy available in the exhaust gases.

While the invention has a particular utility in the conversion of the energy of the exhaust gases to effect the efficient driving of a turbine, the invention is applicable to increase the efficiency of an internal combustion engine even though the exhaust gases are not used for the purpose of driving a turbine. The invention may be used to produce a substantial decrease in back pressure at the exhaust valves toward the end of the exhaust stroke. This action, as will be pointed out hereafter, results in very substantial increase in the energy available from the engine.

The above objects of the invention and further objects, from both structural and operative standpoints, will become apparent from the following description, read in conjunction with the accompanying drawings, in which:

Figure 3 is a pressure-volume diagram illustrating the thermodynamic considerations involved in the invention; and Figure 4 is a diagrammatic view illustrating the pressure and velocity conditions existing in a portion of the modification of Figure 1.

There will be first described various structural embodiments of the invention, after which there may be described the features of operation.

Figure 1:
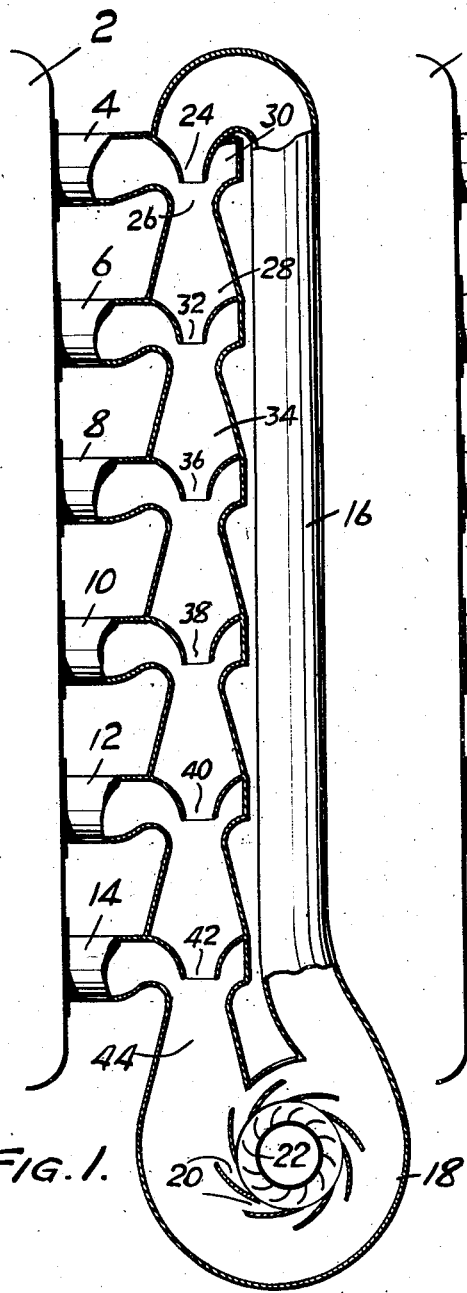
Figure 1 is a diagrammatic sectional view illustrating the feeding of an exhaust gas turbine from a six-cylinder engine.

Referring first to Figure 1, there is illustrated therein at 2 in diagrammatic form a six-cylinder four-cycle internal combustion engine which may be of any conventional type, e. g., it may be a Diesel engine or a spark ignition engine burning any suitable type of fuel. The engine may be assumed to have a conventional cylinder firing order, for example, with the cylinders firing in the order 1, 5, 3, 6, 2, 4. While four-cycle engines will be considered primarily herein for illustrative purposes, it will be evident that the invention is applicable to two-cycle engines with obvious changes.

The exhaust ports from the cylinders, which may be controlled by valves of any conventional type, are illustrated, respectively, at 4, 6, 8, 10, 12 and 14. At 18, there is illustrated a gas chest from which gas is delivered through nozzles 20 to a turbine rotor 22, these ports being conventionalized in Figure 1. The turbine provided in this modification and others herein described is preferably of the type illustrated in my prior Patents 1,926,225, dated September 12, 1933, 1,959,703, dated May 22, 1934, and 2,283,176, dated May 19, 1942, and need not be described herein in detail. It will be understood hereafter that the turbine, in any event, is preferably of the type having admission of driving gas continuously throughout the periphery of the rotor as indicated conventionally in Figure 1, in which the nozzles are illustrated surrounding the entire periphery of the rotor and in constant communication with the annular gas chest.

The gas chest 18 communicates in tangential fashion through a pipe 16 with a nozzle 24. This nozzle is located slightly in advance of the throat 26 of a venturi having a diffuser portion indicated at 28 and having an entrance portion 30 surrounding the nozzle 24 and in communication with the exhaust passage 4 of the first cylinder. At the delivery end of the diffuser 28 there is provided a nozzle 32, which, in turn, is located slightly in advance of the throat of a venturi 34, having a diffuser portion and communicating with the exhaust port 6 of the second cylinder. This is followed by similar arrangements, the nozzles of which are indicated at 36, 38, 40 and 42, each arranged to discharge into the throat portion of a venturi having a diffuser outlet communicating with the next nozzle and arranged at its inner end to receive gases from an exhaust passage of a corresponding cylinder. The last nozzle 42 discharges into the throat of a venturi indicated at 44, the diffuser portion of which opens tangentially into the gas chest 18 as indicated in Figure 1.

The operation of this first modification will be discussed in greater detail hereafter, but it may be preliminarily remarked that recirculating gas returning from the gas chest 18 by way of pipe 16 attains a high velocity in the nozzle 24 to exert an ejector action on the exhaust port 4. The gases from this nozzle and from the exhaust port then pass through the diffuser portion 28 with reduction in velocity and rise in pressure and are then accelerated, by the nozzle 32, to produce an ejector action on the exhaust passage 6. This action is repeated, the aggregate gases being ultimately directed into the gas chest 18 through diffuser 44, in which their pressure is raised. From this they may flow in part through the nozzles 20 to the turbine rotor and in part return through 16. The inlet ends of the nozzles 20 are arranged to take off in tangential fashion the gases circulating in the gas chest 18 so that the gases may have a quite high velocity of approach as they enter the nozzles. In this modification, however, the energy of the gases entering the turbine nozzles is intended to be primarily heat and pressure energy resulting from the transformation occurring in the diffuser 44, and their velocity and kinetic energy may be quite low.

It will be noted that the various nozzles cooperating with the exhaust passages from the engine, increase in size, as do the Venturi elements, to accommodate the larger volumes of gas in the system as the gas chest 18 is approached.

Figure 2:
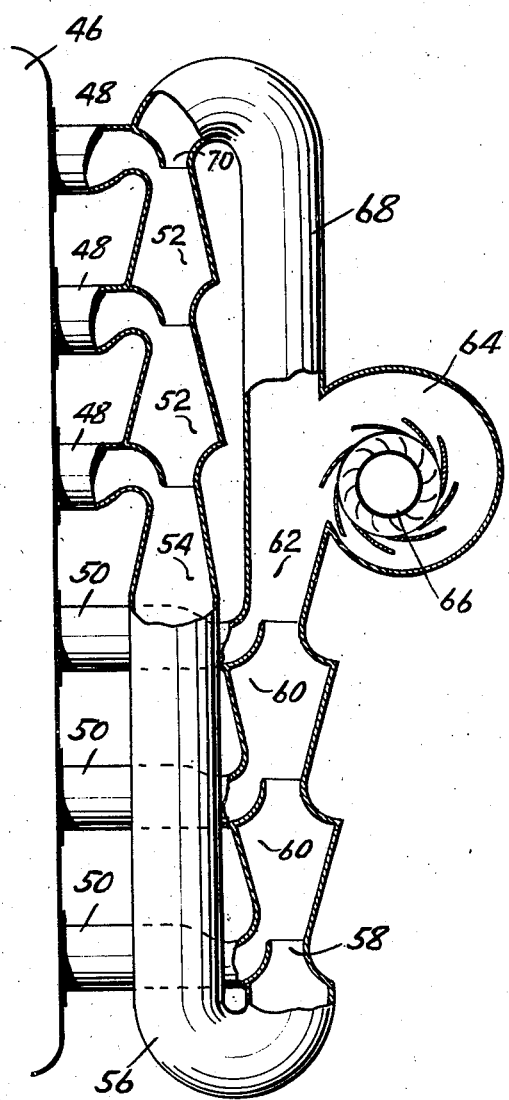
Figure 2 is a similar view of a modification in which greater compactness is attained.

Figure 2 is essentially similar to Figure 1, but illustrates a modification by which substantial saving of space may be effected. In this modification, a six-cylinder engine, illustrated at 46, is provided with discharge passages 48 and 50 from groups of cylinders, the first consisting of the first, second and third cylinders, and the other of the fourth, fifth and sixth cylinders. The first two cylinders are associated with Venturi and nozzle arrangements, indicated at 52, and similar to the corresponding arrangements of Figure 1, while the exhaust passage from the third cylinder flows into a diffuser 54, communicating with a pipe 56 at the end of which is located a nozzle 58 discharging gases into the diffuser members 60 associated with the fifth and sixth cylinders. The nozzles of these arrangements discharge into the diffuser passage 62, which communicates with the exhaust passage from the fourth cylinder and discharges into the gas chest 64 feeding through suitable nozzles the rotor 66 of a turbine. Recirculation of the gases is effected through pipe 68, which discharges through nozzle 70 into the venturi 52. As will be evident from the drawings, the passages vary in cross-sectional area to accommodate the varying volumes of flow. A fairly high pressure may be secured in this modification with the gas chest 64.

With this preliminary explanation, the attainment of the advantages of the invention may be more fully discussed in conjunction with the diagrams of Figures 3 and 4.

Referring first to Figure 3, there are illustrated therein various curves of a pressure-volume diagram which indicate the general advantages gained by the use of the invention either with or without the driving of a turbine. Atmospheric pressure is indicated by the line $At$. The indicator diagram of the internal combustion engine operating in accordance with the invention and in connection with any of the modifications heretofore described, is indicated at A, B, C, D, E, A. The scale is, of course, such that the maximum pressure occurring at the firing of the mixture will be well off the diagram illustrated. Compression, as usual, takes place along the line AB, explosion from B to C, exhaust from C to E, and admission from E to A, though admission is desirably begun before the exhaust valve closes, so as to effect scavenging.

The indicator diagram just described is shown as dropping to the line $c$ which represents the pressure produced by the ejector action. If ejector action was not present the exhaust stroke would take place along some line such as $b$, which would represent the normal back pressure upon the exhaust passages. The line $a$ represents the supercharging pressure.

Considering the pressure-volume diagram as having represented as the abscissa specific volume so that any area thereon represents the energy of one pound of working fluid, various energy values may be indicated on the diagram. For example, the area AFGE represents the energy required to compress the air in the supercharger to the supercharging pressure $a$. While no supercharger has been specifically described, it may be understood that the exhaust gas turbine would generally be used to drive a supercharger and hence the area just mentioned may represent useful work to be performed by the turbine.

The energy available for driving the supercharger by expansion from the pressure $b$ of the exhaust gases of the engine in an exhaust turbine in an arrangement in which the invention is not used is represented by the area GHIK. This area represents the sole energy that would be available by the use of the best possible accumulator and turbine design which did not involve the use of primary nozzles in accordance with the invention. The energy represented by the area IJL represents that part of the exhaust energy that cannot possibly be utilized with conventional installations without the use of primary nozzles.

In accordance with the present invention, however, involving the conversion of heat and pressure energy into velocity in primary nozzles, a large portion of this last named energy is converted in the primary nozzles into kinetic energy, the converted energy being represented, for example, by the shaded area QNO. The energy thus produced may be partially utilized to produce an ejector action and partly added to the energy otherwise available represented by the area GHIK for driving an exhaust turbine. The ejector action effects a lowering of the back pressure from $b$ to $c$, and the shaded region between M, Q and the line $c$ represents a positive area on the engine indicator diagram representing useful work which is secured from the engine by the ejector action. The added energy available for the exhaust turbine is, therefore, the difference between the two shaded areas. Thus, assuming the driving of an exhaust turbine the invention provides both added energy for the driving of the turbine and the increase of the available energy from the engine.

These, however, are not the sole advantageous results, but are only the thermodynamic advantages of the invention. The ejector action permits effective scavenging by reason of the fact that the supercharging pressure $a$ is very substantially greater than the exhaust pressure $c$. In small units, particularly of the Diesel type in which, owing to the lower exhaust temperatures, the exhaust energy is low, the normally attained exhaust pressure $b$ may be higher than the available supercharging pressure $a$. Under such conditions, scavenging is obviously impossible. However, by the use of the primary nozzle arrangement, the exhaust pressure $c$ can always be brought below the supercharging pressure $a$ and consequently scavenging may be effected. The possibility of effective scavenging also involves the introduction of a larger amount of explosive mixture, which increases the effective output of the engine over that secured if scavenging is not provided. In case of carburetor types of engines the cooler mixture thus obtained also permits higher compression, which additionally augments the power output. Additionally, provision is made for the maintenance of substantially constant pressure in the supply for the turbine nozzles and greatly increased turbine efficiency results.

The primary nozzles through which the exhaust gases pass from the exhaust passages must be properly designed to correspond with the operation of the engine. The heavy line curves in Figure 3 illustrate such proper operation. If the area of the primary nozzles is made too small, a much greater portion of the exhaust energy represented by the area IJL may be converted into kinetic energy, as indicated by the area under the curve N' as compared with that under the area N. As a result, the ejector effect of the primary nozzles causes a lowering of the back pressure against which the engine has to exhaust toward the end of the exhaust stroke, this lowering being, for example, to the value $c'$, as compared with $c$. However, during the beginning of the exhaust stroke the back pressure is much higher, as indicated by the line D' compared with D, so that it can be seen that far more power is lost by reason of the high back pressure during the beginning of the exhaust stroke than is gained by the reduced back pressure toward the end of the exhaust stroke. The increase of energy available to drive the turbine is not usually of substantial importance, since what is most important is the power output of the engine and the possible increase in supercharging pressure will not give sufficient additional power output to offset the decrease of the area between the curves D and D'.

Likewise, the effect of too large primary nozzles is undesirable. With large primary nozzles, the area under the curve N will be very greatly reduced and comparatively little of the exhaust energy will be transformed into kinetic energy. The result of this is decrease in the ejector action so as to reduce quite substantially the shaded area beneath the line MQ, which, as pointed out above, represents an increase in power output of the engine. It is true that the back pressure against which the engine exhausts at the beginning of the exhaust stroke is lowered; however, this lowering of the back pressure occurs substantially only during a practically dead center condition of the crank so that very little, if any, increase in the area of the diagram representing useful energy is secured. The net result of this is a decrease of the power output of the engine. There is accordingly an optimum size for the primary nozzles which will give substantially the results indicated in Figure 3, though considerable variations from this optimum nozzle size are possible with very little change in the effective power output of the engine. The change in nozzle size does, however, make considerable variations in the energy available to drive a turbine and in the back pressure, and consequent effectiveness of scavenging. It will be understood that the kinetic energy produced by the primary nozzle transformation may be used directly, or transformed into heat and pressure energy for reconversion into kinetic energy in the turbine nozzles as in Figures 1 and 2.

The arrangements illustrated in Figures 1 and 2 effect a reduction of back pressure and maintenance of substantially constant pressure on the turbine nozzles and the operation, with specific reference to Figure 1, is illustrated in the diagrams of Figure 4. In the upper portion of that figure there are shown the parts associated with one of the intermediate exhaust passages, specifically, passage 6. Pressures and velocities are indicated in the lower diagram corresponding to the regions R, S, T and U, respectively, in the exhaust passage 6 in the throat of the venturi immediately surrounding the nozzle 32, in nozzle 32 and at the widest portion of venturi 34. The curves, it will be noted, correspond substantially to the period of exhaust through the exhaust passage 6.

At the opening of the exhaust valve the pressure in the passage 6 increases rapidly to a high value R and then immediately decreases to an average value, which will be that produced by the ejector action of flow through the nozzle 32. As gases enter the passage 6, an increase in their velocity will occur, as indicated by the curve R in the lower diagram and corresponding to this relatively slight increase of velocity and the large increase in pressure in the passage 6, there will be a very great increase of velocity through the throat of the venturi S, which acts in conjunction with the nozzle at T to provide an annular primary nozzle. At the same time, the pressure will drop quite considerably. By reason of the high velocity of flow through S, an ejector action is exerted on the nozzle T with a resulting drop of pressure at the throat of this nozzle and increase in velocity of its flow. The increased flow through S and T will produce a somewhat lagging increase in pressure in the wide portion of the venturi 34 at U, and will also increase the velocity at U. A correspondingly greater increase of velocity through the nozzle 36 will then result effecting increased ejector action all along the line thereafter upon the exhaust passages from the other cylinders. The curves indicated at U, it will be noted, show rather slight variations in pressure and velocity, even in the local venturis and in the venturi 44 the variations in pressure and velocity will be quite small, with the result that despite large fluctuations in pressure and velocity at the exhaust passages from the various cylinders, there is maintained in the gas chest 18 a substantially constant elevated pressure and velocity of flow. The velocity of flow through the gas chest 18 represents an approach velocity of the gases to the turbine nozzles, which should be designed to take account of this substantial approach velocity in transforming the gases into the high velocities required to feed the turbine buckets.

The venturis and recirculation illustrated in Figures 1 and 4 play an important part in the securing of highly efficient transformations, inasmuch as by their action, and particularly in combination, substantially constant pressures are maintained at the throats of the venturis preventing substantial refilling with gases of the exhaust passages R between adjacent cylinder discharges. In other words the flow through the passages at S is maintained substantially unidirectional. As compared with this, in previous arrangements, such, for example, as that illustrated in German Patent 178,042, such fluctuations in pressure occur as will result in repeated emptying and filling of idle exhaust passages with consequent great useless waste of energy. As indicated by the curves in Figure 4, fluctuations are so smoothed out that no substantial increase in pressure over the minimum will ever occur at the location S whereby refilling is avoided. The energy wasted in refilling would become unavailable for the ejector action. It is also desirable to have the exhaust passages at R as small as possible so that in the event of any reverse flow the amount of such flow will be very small.

It will be noted that in the feeding of the turbines, the turbine nozzles are not made to take any part in the preliminary transformations, nor are they made to accomplish the ejector action. Any tampering with the turbine nozzles for this purpose would result in great reduction of their efficiency for the purpose of driving the turbine, resulting, for example, in disturbance in the direction of jet flow and possibly only the partial use of the turbine blading, which latter would result in very substantial ventilation losses. In accordance with the invention the transformation occurs in a plurality of steps, there being first secured a substantially constant pressure in a gas chest from which the gases flow through the turbine nozzle to have their heat and pressure, and possibly substantial kinetic energy, transformed into the high kinetic energy of a driving jet, arranged for full admission over the entire turbine blading.

Where reference is made herein to nozzles designed to accelerate the gases, the term is used in the thermodynamic sense. A nozzle in that sense is an efficient thermodynamic apparatus having various well defined characteristics. With the occurrence of a substantial pressure drop it converts heat and pressure energy into velocity with an efficiency of about 90%. It has a flow coefficient of around 95%, i. e., it will pass 95% of the mass flow that can be passed theoretically through an area corresponding to the minimum nozzle opening, and it will accurately direct the flow in a definite direction in the form of a smooth jet. As compared with a nozzle, an ordinary orifice will have a flow coefficient of between 50% and 75% and efficiency for energy conversion of between 50% and 75%. The flow is generally very disturbed and has badly eddying boundary layers. In the present applications of nozzles, it will be evident that, particularly in the case of the turbine nozzles, design should be made to take into account any high approach velocities. If, in fact, expansion is substantially completed in the primary nozzles, the secondary turbine nozzles may provide for little or no further expansion. The term "diffuser" is also used in the thermodynamic sense of a diverging passage designed for the efficient deceleration of flow velocity with corresponding increase in pressure. The design of nozzles and diffusers to accomplish these ends may be in accordance with conventional practice, and reference may be made, for example, to "Steam and Gas Turbines," by Stodola, translation by Loenwenstein, McGraw-Hill Book Company, Inc., 1927, for design considerations.

What I claim and desire to protect by Letters Patent is:

1. In combination, a multicylinder internal combustion engine having individual exhaust passages from the cylinders thereof, and a common passage for exhaust gases from a plurality of the cylinders, said common passage comprising a nozzle for creating a high velocity jet of exhaust gases flowing through the common passage, the individual exhaust passage from one of said cylinders leading its exhaust gases directly to the region about said high velocity jet and entirely beyond the outlet of said nozzle so that an ejector action occurs to reduce the pressure in said individual exhaust passage, said common passage comprising a diffuser portion into which said high velocity jet discharges for substantial conversion of its kinetic energy and that of gas from said individual exhaust passage into pressure energy, and said common passage comprising a second nozzle for receiving gases from said diffuser portion to create a high velocity jet for effecting reduction of pressure by ejector action in another subsequent individual exhaust passage communicating with the last named jet in the aforesaid fashion, said common exhaust passage delivering the exhaust gases with pressure fluctuations substantially damped.

2. In combination, a multicylinder internal combustion engine having individual exhaust passages from the cylinders thereof, and a common endless passage for recirculation of exhaust gases from a plurality of the cylinders, said common passage comprising a nozzle for creating a high velocity jet of exhaust gases flowing through the common passage, the individual exhaust passage from one of said cylinders leading its exhaust gases directly to the region about said high velocity jet and entirely beyond the outlet of said nozzle so that an ejector action occurs to reduce the pressure in said individual exhaust passage, said common passage comprising a diffuser portion into which said high velocity jet discharges for substantial conversion of its kinetic energy and that of gas from said individual exhaust passage into pressure energy, and said common passage comprising a second nozzle for receiving gases from said diffuser portion to create a high velocity jet for effecting reduction of pressure by ejector action in another subsequent individual exhaust passage communicating with the last named jet in the aforesaid fashion, said common exhaust passage having a portion from which the exhaust gases are discharged with pressure fluctuations substantially damped.

3. In combination, a multicylinder internal combustion engine having exhaust passages from the cylinders thereof, a turbine having a rotor, a nozzle from which exhaust gases pass in the form of a high velocity jet, one of said exhaust passages leading its exhaust gases directly to the region about said high velocity jet and entirely beyond the outlet of said nozzle so that an ejector action occurs to reduce the pressure in said exhaust passage, a diffuser passage into which said high velocity jet discharges for substantial conversion of its kinetic energy and that of gas from said exhaust passage into pressure energy, a passage into which said diffuser passage discharges its gases with pressure fluctuations substantially damped, and nozzles for converting pressure energy of the gases from the last mentioned passage into kinetic energy and for directing them to said turbine rotor at high velocity to drive the same.

4. In combination, a multicylinder internal combustion engine having exhaust passages from the cylinders thereof, a turbine having a rotor, a nozzle from which exhaust gases pass in the form of a high velocity jet, means for providing said nozzle with exhaust gases from the engine having pressure fluctuations substantially damped, one of said exhaust passages leading its exhaust gases directly to the region about said high velocity jet and entirely beyond the outlet of said nozzle so that an ejector action occurs to reduce the pressure in said exhaust passage, a diffuser passage into which said high velocity jet discharges for substantial conversion of its kinetic energy and that of gas from said exhaust passage into pressure energy, a passage into which said diffuser passage discharges its gases with pressure fluctuations substantially damped, and nozzles for converting pressure energy of the gases from the last mentioned passage into kinetic energy and for directing them to said turbine rotor at high velocity to drive the same.

RUDOLPH BIRMANN.